April 1, 1952     A. LATHAM, JR., ET AL     2,591,168
APPARATUS FOR REFRIGERATING ENCLOSURES
Filed Jan. 21, 1948     3 Sheets-Sheet 1
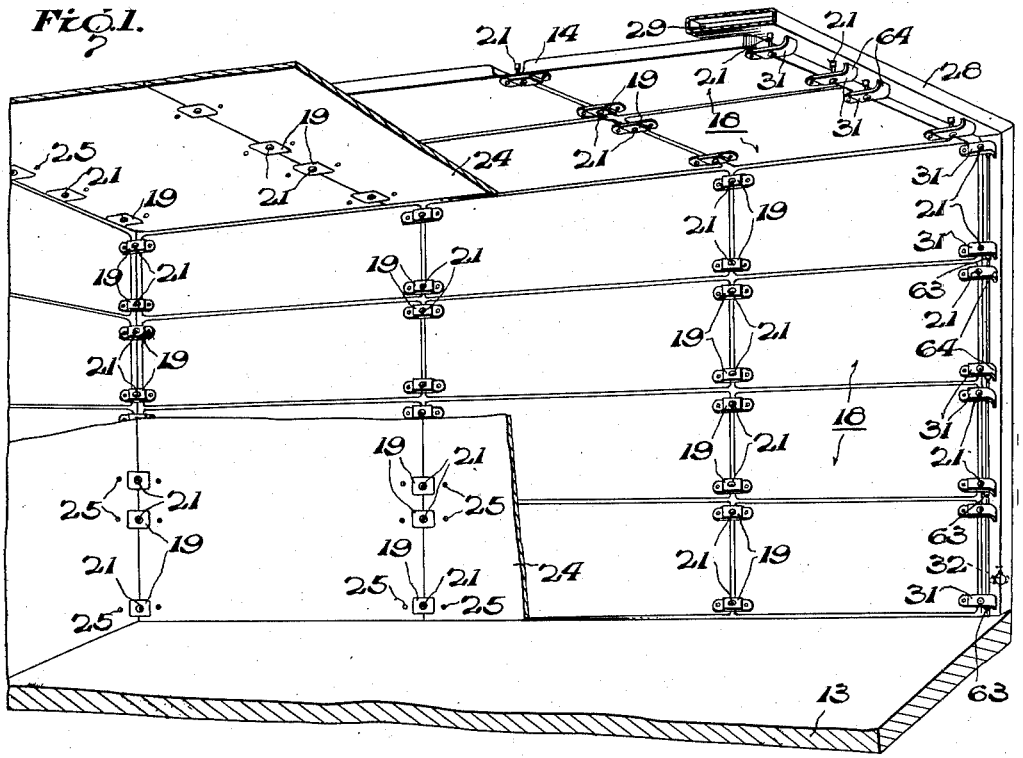
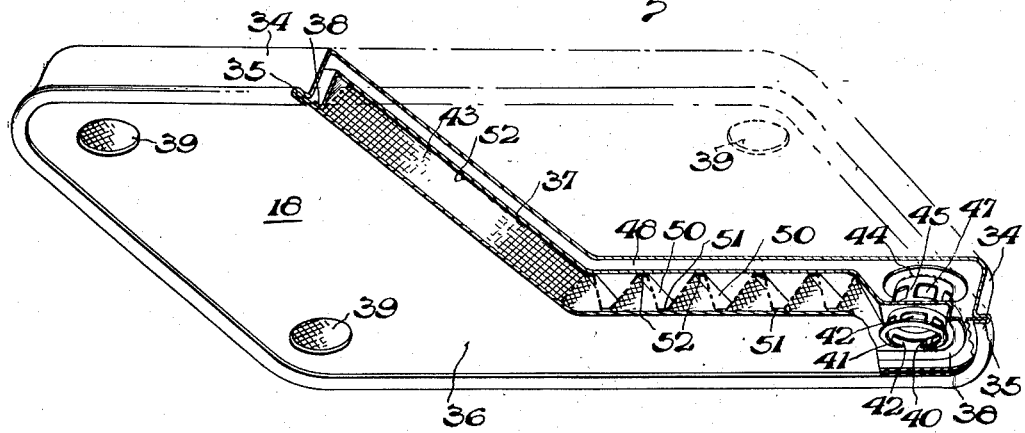
INVENTORS
Allen Latham Jr.
John R. Swanton Jr.
BY Cameron, Kerkam & Sutton
Attorneys April 1, 1952  A. LATHAM, JR., ET AL  2,591,168
APPARATUS FOR REFRIGERATING ENCLOSURES
Filed Jan. 21, 1948  3 Sheets-Sheet 2
Fig. 3.
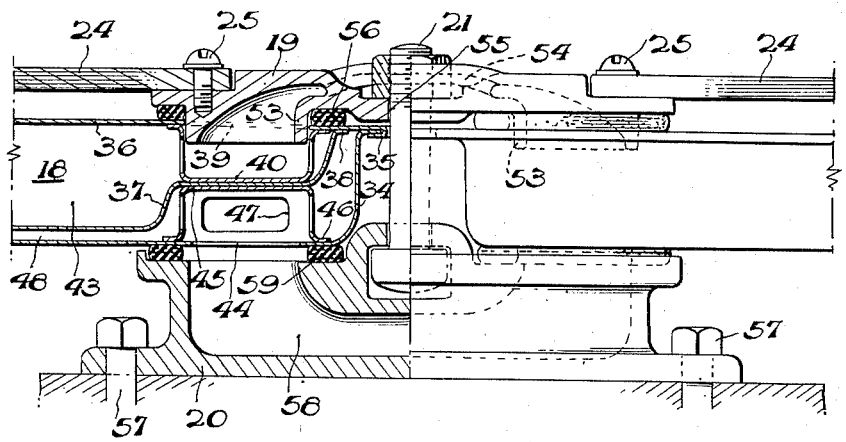
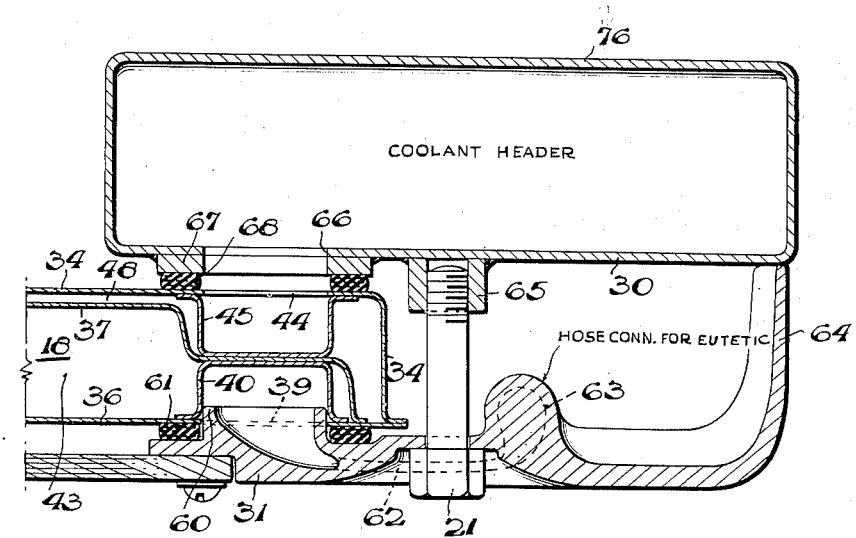
Fig. 4.
INVENTORS
Allen Latham Jr.
BY John R. Swanton Jr.
Cameron, Kerkam + Sutton
Attorneys

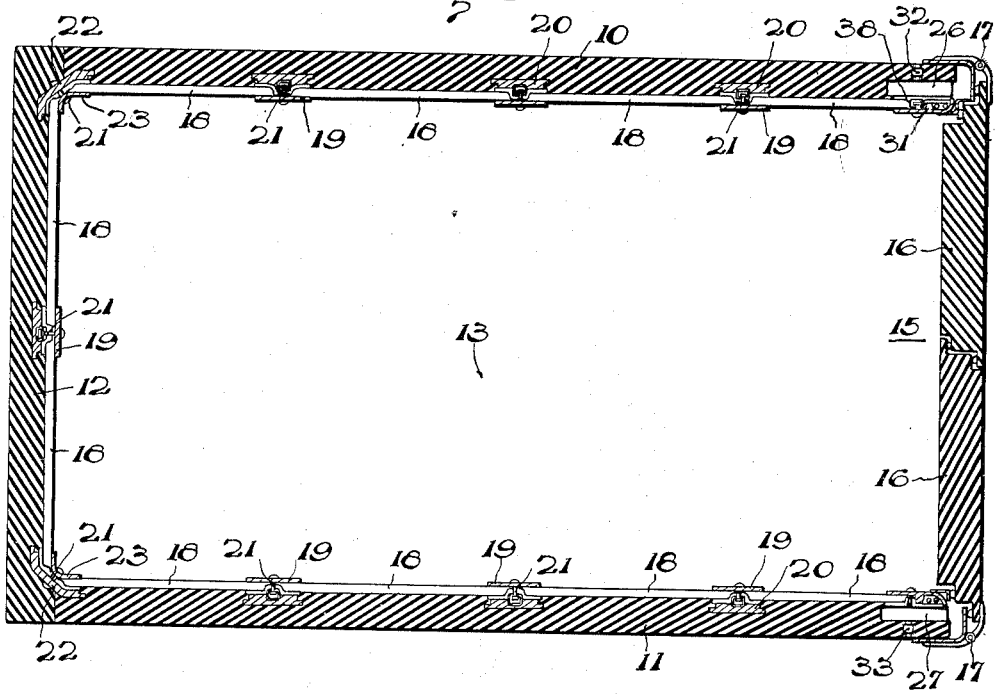

Patented Apr. 1, 1952

2,591,168

UNITED STATES PATENT OFFICE 2,591,168

APPARATUS FOR REFRIGERATING ENCLOSURES

Allen Latham, Jr., Jamaica Plain, and John R. Swanton, Jr., Newton, Mass., assignors, by mesne assignments, to Hodges Research and Development Company, San Francisco, Calif., a corporation of California Application January 21, 1948, Serial No. 3,414

10 Claims. (Cl. 62—126)

The present invention relates to methods and apparatus for heating or refrigerating enclosures and more particularly to such methods and apparatus in which additional heating or cooling is provided after the initial heating or cooling to hold the temperature of the enclosure at the desired temperature for extended periods.

More particularly, this invention relates to methods and apparatus for heating or refrigerating and maintaining heating or refrigerating temperatures for extended periods of time within portable containers intended primarily for the transportation of perishable products.

Heretofore various transportable containers have been proposed employing various structures for insulating the interior of the container to assist in maintaining desired temperatures during transportation. Various heating or refrigerating means have been proposed for such containers to heat or cool the container sufficiently to maintain desired temperatures therein for extended periods. However, all of these containers have suffered from one or more serious defects and in most instances have been too bulky and too heavy for efficient use. This bulk and weight have been required to insulate the interior of the container to maintain desired temperatures.

It is accordingly an object of the present invention to provide novel methods and apparatus for heating or refrigerating enclosures in which an additional source of heat or cold is provided to maintain desired temperatures within the enclosure during extended periods.

Another object is to provide such methods and apparatus which are particularly applicable to transportable containers usable with all forms of transportation.

Another object is to provide such methods and apparatus for obtaining desired temperatures within transportable containers and for maintaining such temperatures therein for extended periods of time.

Another object is to provide such apparatus which because of the relatively small size of each element thereof can be readily and quickly replaced or repaired should damage occur.

Another object is to provide such apparatus which will allow relative movement between the several elements thereof should the container be subjected to distorting forces to prevent rupture or breaking of the elements.

Another object is to provide such apparatus in which the fluid connections between the several elements thereof allow relative movement therebetween without leakage.

Another object is to provide such apparatus in which the several elements thereof containing a heat or cold storage medium are completely filled with such medium.

Another object is to provide such apparatus which is light in weight, simple, compact and readily installable in existing containers and which will not substantially increase the bulk or weight of such containers.

Other and further objects will appear from the following description.

Our inventive concept is capable of embodiment in many mechanical forms one of which is shown in the accompanying drawings for refrigerating a container to illustrate this invention. This illustrative embodiment should not be construed as defining or limiting our invention and reference should be had to the appended claims to determine the scope of our invention.

In the accompanying drawings,

Fig. 1 is a perspective view of a container, partly broken away and looking into the container, showing one embodiment of our invention applied thereto;

Fig. 2 is an elevation, partly in section, of one of the refrigerating tiles of the embodiment of Fig. 1;

Fig. 3 is a sectional view of a bracket for supporting the refrigerating tiles on the walls of the container;

Fig. 4 is a sectional view of a tile adjacent the header for supplying a refrigerant thereto and showing a bracket for supporting the tile; and Fig. 5 is a cross section of the container of Fig. 1 as seen from above showing the relative position of the several refrigerating tiles, the headers, the doors of the container, and the brackets for supporting the tiles on the walls of the container.

The embodiment of our invention shown in the accompanying drawings and described hereinafter is for a refrigerated container but may be employed with equal efficiency to heating a container and comprises a plurality of refrigerating tiles mounted in parallel rows upon the walls, back and top of the container. These tiles are connected for circulation of a refrigerating medium and for supplying or for draining of a suitable heat or cold storage medium having a high latent heat of fusion at the desired operating temperature including water in horizontal rows around the container through passageways formed in the brackets which secure the tiles to the walls of the container. A header is provided for supplying a refrigerating medium to the tiles. The brackets supporting the tile adjacent this header are formed to receive refrigerating medium from the header and to supply the same to these tiles. A second header is provided to receive the refrigerating medium after it has circulated through the tiles and cooled the same. The tile adjacent this header are connected thereto by brackets similar to those at the supply header. A header extends across the top of the container and is connected into the supply and return headers. A dam is interposed medially of this upper header. The tile hung from the roof of the container are connected in parallel and in series and receive refrigerating medium from one side of the upper header through the supporting brackets. These tile discharge the refrigerating medium into the upper header on the other side of the dam after it has passed through and cooled the tile.

The refrigerating tile of our invention are so constructed that a heat or cold storage medium completely fills chambers formed adjacent the faces of the tile forming the interior surface of the container and are constructed to receive a refrigerating medium for circulation therethrough in chambers formed behind the storage chambers. Each of the chambers of the tile has four openings formed therein adjacent each corner of the tile. These openings receive the brackets which support the tile in place. These brackets are constructed to provide passages for the circulation of a refrigerating medium through the tile and for supplying or draining the storage medium.

Should heating of the container be desired it is apparent that a heating medium could be circulated in place of the refrigerating medium to supply heat to a heat storage medium filling the chambers adjacent the faces of the tile.

Referring more particularly to Figs. 1–5 of the drawings, a container is there shown having suitably insulated side walls 10 and 11, an end wall 12, a bottom 13, a top 14 and an open end 15 closed by insulated doors 16 mounted on side walls 10 and 11 by hinges 17. A plurality of refrigerating tile 18 are mounted upon side walls 10 and 11, end wall 12 and top 14 and are secured thereto by inner and outer brackets 19 and 20 and bolts 21, a pair of brackets 19 and 20 being provided for each corner of the tiles 18. The brackets 19 and 20 for the tiles 18 which abut at the corners of the container are suitably shaped to support the tile at such corners and are generally of the shape indicated at 22 and 23 (Fig. 5). When desirable, plywood sheets 24 may be mounted over the inner surface of tiles 18 to protect the same from the cargo in the container. Sheets 24 are held in place by bolts 25 which screw into brackets 19.

Vertical headers 26 and 27 are arranged on opposite sides of opening 15 and are connected across the top of the container by horizontal header 28. Header 28 is divided into two sections by a dam 29. The ends of the tile 18 adjacent headers 26, 27 and 28 are secured thereto by brackets 30 and 31 and bolts 21. Header 26 is provided with a manually operable inlet valve 32 to receive a refrigerating medium from any suitable source of supply of the same. Header 27 is provided with a manually operable valve 33 through which the refrigerating medium may be returned to the source of the same after circulation through the tile 18.

The tile 18 mounted upon top 14 of the container are connected in parallel and in series to receive refrigerating medium from header 28 on the side of dam 29 adjacent header 26 and to discharge the refrigerating medium after circulation through tile 18 to that part of header 28 on the other side of dam 29 adjacent header 27.

Referring more particularly to Fig. 2, refrigerating tile 18 is there shown in enlarged detail, partly in section, and comprises an outer dish-shaped member 34 which is turned over at 35 to form a fluid-tight connection with a flat closure member 36. A second dish-shaped member 37 is mounted within member 34 and is secured along its edges 38 to closure 36. Member 37 may be secured to closure 36 by any suitable means, here shown as by welding. Member 36 is provided with four circular openings 39 arranged adjacent each corner thereof. Mounted within member 37 and beneath each opening 39 is a thimble 40 provided with an outturned flange 41 which is welded around opening 39. Thimble 40 is provided with apertures 42 to permit circulation of a heat or cold storage medium through the chamber 43 defined by closure 36 and member 37 to fill the same and extends from member 36 to member 37.

Member 34 is also provided with four circular openings 44 adjacent each corner thereof. Mounted within member 34 and surrounding each opening 44 is a thimble 45 having an outwardly turned flange 46 which is welded to member 34. Thimble 45 is apertured at 47 to permit the passage of refrigerating medium therethrough and into the chamber 48 defined by member 34 and member 37 and extends from member 34 to member 37. Preferably chamber 48 should have relatively little depth as compared to the chamber 43. Because of the greater depth of chamber 43 it may be desirable when using certain types of heat and cold storage mediums to provide heat transfer elements therein. These elements may be provided by an expanded metal open mesh screen 50 contacting closure 36 at points 51 and welded to member 37 at points 52. Screen 50 should have openings which will permit the ready passage of the heat and cold storage mediums. Members 36 and 37 should be sufficiently resilient to allow for expansion of the medium in chamber 43 upon freezing.

Referring particularly to Fig. 3, it will be seen that each bracket 19 is provided with inwardly extending nipples 53 which enter openings 39 in tile 18. Nipples 53 are hollow and are interconnected by a passage 54. Passage 54 passes around opening 55 formed in bracket 19 to receive bolt 21. A gasket 56 may be mounted around nipple 53 to form a fluid-tight joint with member 36. Bracket 20 is secured to the walls of the container by bolts 57 and is provided with a passage 58 for connecting openings 44 of tile 18. A gasket 59 may be interposed between the mouth of passage 58 and opening 44 to form a fluid-tight seal with member 34.

The construction of brackets 30 and 31 for supporting tile 18 adjacent headers 26, 27 or 28 is shown in Fig. 4. Bracket 31 has an inwardly extending hollow nipple 60 received by opening 39 of tile 18. A gasket 61 surrounds nipple 60 to form a fluid-tight seal with member 36. Hollow nipple 60 is connected by passage 62 to a suitable nipple 63 mounted for protection within the hollow space defined by wall 64 of bracket 31. Nipples 63 receive hoses or other suitable flexible conduits for supplying heat or cold storage medium to tile 18 or for draining the same therefrom. Bracket 30 may be separately formed and secured to header 26, 27 or 28 or, as shown, may be formed as a part thereof. Bracket 30 includes a boss 65 which is threaded to receive bolt 21. Header 26 is apertured at 66 for cooperation with openings 44 of tile 18. Apertures 66 may be reinforced by a surrounding washer 67. A suitable gasket 68 may be interposed between member 34 and washer 67 to form a fluid-tight joint therebetween.

With the embodiment of our invention set up as above described, when it is desired to refrigerate the container and to supply additional cooling to maintain refrigerating temperatures for extended periods, a cold storage medium is supplied to the several chambers 43 to completely fill them by connecting nipples 63 to a source of supply of such medium. The storage medium then flows through nipples 63, passages 62 and nipples 60 into chambers 43 of the tile 18 adjacent brackets 31. The storage medium flows through these chambers 43 and thence through nipples 53 and passages 54 of brackets 19 and into chambers 43 of the next adjacent tile 18 until all of the chambers 43 of the several tiles 18 are completely filled with the storage medium. The supply of the storage medium is then shut off and nipples 63 are closed by any suitable means. After the chambers 43 have been filled with storage medium circulation of refrigerating medium through chambers 48 may be started. Valve 32 is connected to a source of supply of refrigerating medium and is opened. Valve 33 is connected to the return side of the source of supply of refrigerating medium and is also opened. Refrigerating medium is then pumped through valve 32 into headers 26 and 28 and passes through openings 44 into chambers 48 of tiles 18 adjacent these headers. Refrigerating medium flows through these chambers 48 and passes through passageways 58 in brackets 20 to openings 44 in adjacent tile 18 and into chambers 48 until the refrigerating medium passes out of chambers 48 into header 27 and out of valve 33 for return to the source of refrigerating medium. Passage of the refrigerating medium through the several chambers 48 cools the tile 18 and the interior of the container and at the same time freezes the storage medium contained in chambers 43.

Perishable products may be loaded into the container either before the container is cooled, during cooling or after the interior of the container has been brought to refrigerating temperatures as preferred. As soon as the container is loaded the doors 16 are closed. If the storage medium in chambers 43 is frozen or is partially frozen, as required, the container is ready for transit. Valve 32 is then closed and its connection to the source of refrigerating medium is broken. Valve 33 may be closed at this time to keep the several tile 18 full of refrigerating medium if it is desired to have the additional cold supplied by the retention of the refrigerating medium within the tile 18. Normally such additional cold is not required and the frozen medium in chambers 43 is sufficient to maintain the container at the desired refrigerating temperatures for the duration of the transportation. The refrigerating medium is then drained from the several chambers 48. Valve 33 should be left open until all of the refrigerating medium has been returned to the source of supply and thereafter closed.

It will now be apparent that by the present invention we have provided a novel method and apparatus for heating or refrigerating enclosures and for maintaining desired temperatures therein which are particularly applicable to transportable containers and which are efficient, simple and easy to install, repair or replace in existing containers without unduly adding to the bulk or weight of existing or new containers and which allow relative movement without leakage between the several elements to prevent breakage due to distortion of the container.

Changes to or modifications of the above described illustrative embodiment of our invention may now be suggested to those skilled in the art without departing from our inventive concept. Reference should therefore be had to the appended claims to determine the scope of this invention.

What is claimed is:

1. In apparatus as described including an insulated enclosure to be temperature conditioned, a plurality of temperature conditioning tile comprising inner and outer chambers in heat exchange relationship, brackets securing said tile to the inner surface of the enclosure with said outer chambers adjacent thereto, means including passages in said brackets for connecting said inner chambers in parallel and for connecting said outer chambers in parallel, a storage medium in said inner chambers and means for circulating a heat transfer medium through said outer chambers.

2. Apparatus as described in claim 1 in which said tile are approximately rectangular parallelepipeds in shape and in which said brackets are arranged adjacent each corner of said tile.

3. Apparatus as described in claim 1 in which said brackets include an outer element secured to the inner surface of the enclosure and having a passage therethrough for connecting adjacent outer chambers, an inner element having a passage therethrough for connecting adjacent inner chambers and means for clamping said inner and said outer elements together.

4. Apparatus as described in claim 1 in which said tile are approximately rectangular parallelepipeds in shape and in which said inner and said outer chambers are apertured adjacent each corner thereof and said brackets engage in and form a fluid-tight seal with said apertures.

5. Apparatus as described in claim 1 in which said tile are approximately rectangular parallelepipeds in shape and in which said inner and said outer chambers are apertured adjacent each corner thereof and said brackets engage in and form a fluid-tight seal therewith with said passageways opening into said apertures.

6. In apparatus as described including an insulated enclosure to be temperature conditioned provided with insulated doors, a plurality of temperature conditioning tile comprising inner and outer chambers, brackets securing said tile to the inner surface of the enclosure with said outer chamber adjacent thereto, means including passages in said brackets for connecting said inner chambers in parallel and for connecting said outer chambers in parallel, a header mounted in the wall of the enclosure adjacent the doors, brackets supporting said tile adjacent said header and providing communication between said header and adjacent outer chambers and means for supplying a heat transfer medium to said header.

7. In apparatus as described including an insulated enclosure to be temperature conditioned provided with insulated doors, a plurality of temperature conditioning tile comprising inner and outer chambers, brackets securing said tile to the inner surface of the enclosure with said outer chamber adjacent thereto, means including passages in said brackets for connecting said inner chambers in parallel and for connecting said outer chambers in parallel, a supply header mounted in the wall of the enclosure adjacent one side of the door, a return header mounted in the wall of the enclosure adjacent the other side of the door, brackets supporting said tile adjacent said headers and placing said outer chambers thereof in communication therewith, a storage medium in said inner chambers and means for supplying a heat transfer medium to said supply header and for withdrawing said heat transfer medium from said return header.

8. Apparatus as defined in claim 7 in which said brackets adjacent said headers include passages communicating with said inner chambers and means communicating with said passages for supplying a storage medium thereto.

9. Apparatus as defined in claim 7 including a header mounted in the roof of the enclosure and connecting said supply and said return headers and a dam in said last named header, said tile secured to the roof of the enclosure being connected in series to the supply and return sides of said last named header.

10. In a temperature conditioning tile as described, an outer approximately rectangular dish-shaped member, a flat closure member for said member, a second approximately rectangular dish-shaped member mounted within said first named member and forming separate non-communicating chambers therein in heat exchange relationship, said closure member and said first named member being apertured adjacent each corner thereof, and apertured thimbles mounted in each of said apertures and extending to said second named dish-shaped member.

ALLEN LATHAM, Jr.
JOHN R. SWANTON, Jr.

REFERENCES CITED

The following references are of record in the file of this patent:

UNITED STATES PATENTS

| Number | Name | Date |
| --- | --- | --- |
| 1,330,927 | Watkins | Feb. 17, 1920 |
| 2,002,444 | Woodruff | May 21, 1935 |
| 2,002,605 | Kincaid | May 28, 1935 |
| 2,012,308 | Heitmann | Aug. 27, 1935 |
| 2,016,377 | Krotzer | Oct. 8, 1935 |
| 2,058,924 | Tiffany | Oct. 27, 1936 |
| 2,145,308 | Jordan et al. | Jan. 31, 1939 |
| 2,156,544 | Raskin | May 2, 1939 |
| 2,229,438 | Birdsall | Jan. 21, 1941 |
| 2,231,012 | Kleist | Feb. 11, 1941 |
| 2,323,354 | Rees | July 6, 1943 |
| 2,428,312 | Herbener | Sept. 30, 1947 |